United States Patent
Yamazaki et al.

(10) Patent No.: US 8,602,939 B2
(45) Date of Patent: Dec. 10, 2013

(54) CONTROLLING VEHICLE CREEP

(75) Inventors: Mark S. Yamazaki, Canton, MI (US); Marvin P. Kraska, Dearborn, MI (US); Dan Colvin, Farmington Hills, MI (US); Fazal U. Syed, Canton, MI (US); Brandon R. Masterson, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 13/176,084

(22) Filed: Jul. 5, 2011

(65) Prior Publication Data

US 2013/0012355 A1 Jan. 10, 2013

(51) Int. Cl.
*B60W 20/00* (2006.01)

(52) U.S. Cl.
USPC ............................................................ 477/5

(58) Field of Classification Search
USPC ................................................................ 477/5
See application file for complete search history.

(56) References Cited

U.S. PATENT DOCUMENTS

| | | | |
|---|---|---|---|
| 6,048,289 A * | 4/2000 | Hattori et al. | 477/15 |
| 7,035,727 B2 * | 4/2006 | De La Salle et al. | 701/93 |
| 2006/0258506 A1 * | 11/2006 | Ibamoto et al. | 477/5 |
| 2009/0093336 A1 * | 4/2009 | Soliman et al. | 477/5 |

* cited by examiner

*Primary Examiner* — Sherry Estremsky
(74) *Attorney, Agent, or Firm* — David B. Kelley; MacMillan, Sobanski & Todd, LLC

(57) ABSTRACT

A method for controlling vehicle creep includes controlling motor speed to produce the desired creep speed, if desired creep speed exceeds vehicle speed; controlling motor torque to produce the desired wheel torque, if desired wheel torque exceeds actual wheel torque; and controlling motor torque to decelerate the vehicle to creep speed, if vehicle speed is decreasing and exceeds the desired speed.

24 Claims, 4 Drawing Sheets

CONTROLLING VEHICLE CREEP

BACKGROUND OF THE INVENTION

1. Field of the Invention

This invention relates generally to an apparatus for controlling vehicle creep in response to accelerator pedal and brake pedal signals using a powertrain that includes an electric motor and launch clutch.

2. Description of the Prior Art

In a conventional vehicle equipped with an internal-combustion and automatic transmission, the vehicle can creep forward or backward when the shift lever is in a forward or reverse driving position. When the driver's foot is off of the accelerator pedal, and either off or slightly depressing the brake pedal, the vehicle will creep forward or backward at low speed, e.g. 10 kph. In the conventional configuration, the engine shaft is always rotating at idle speed or higher. The transmission pump, driven by the engine shaft, provides hydraulic pressure to the transmission. The torque converter is allowed to slip and maintain vehicle speed at a constant velocity, i.e. the desired creep speed.

A vehicle equipped with modular hybrid transmission (MHT) creeps due to power supplied by the internal combustion engine or an electric motor, when the engine is not running. Since a MHT vehicle powertrain includes no torque converter, vehicle creep creates unique challenges for the vehicle controls. When the engine is on, the engine disconnect clutch is closed and the engine shaft rotates at idle speed or higher. Thus, the transmission input shaft drives the transmission pump, which provides pressure for operation of the transmission clutches. A launch clutch is allowed to slip and maintain vehicle speed constant, similar to function of a torque converter in a conventional vehicle.

When the engine is off, however, electrical energy is wasted when the electric motor and pump are used solely to provide hydraulic pressure to the transmission. An auxiliary pump can be used to maintain pressure, but this also uses electrical energy unnecessarily. An auxiliary pump would have to be quite large in order to create enough pressure when the input shaft is not rotating, thus adding cost to the vehicle.

Producing vehicle creep using the electric motor requires a method of ensuring that the electric motor is driving the transmission pump and providing hydraulic pressure to the transmission when needed for creep, and then allowing the motor to spin down and conserve energy when not needed.

A need exists in the industry for a method that controls vehicle creep with either engine drive or motor drive, and manages transitions between engine drive and motor drive.

SUMMARY OF THE INVENTION

A method for controlling vehicle creep includes controlling motor speed to produce the desired creep speed, if desired creep speed exceeds vehicle speed; controlling motor torque to produce the desired wheel torque, if desired wheel torque exceeds actual wheel torque; and controlling motor torque to decelerate the vehicle to creep speed, if vehicle speed is decreasing and exceeds the desired speed.

The algorithm coordinates the actions of subsystems during creep in a hybrid electric vehicle, which contains a launch clutch whose torque capacity is controlled to maintain vehicle speed and produce torsional isolation. The algorithm provides smooth transitions between creeping in speed control and driving in torque control. The algorithm is robust, and addresses two footed driving as well as change-of-mind events which occur with frequent brake and accelerator movement, as encountered while driving in parking lots.

Hydraulic pressure is provided for actuating transmission control clutches and brakes when needed and using the electric drive motor to drive a pump. Energy is conserved by stopping the electric motor when not needed.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
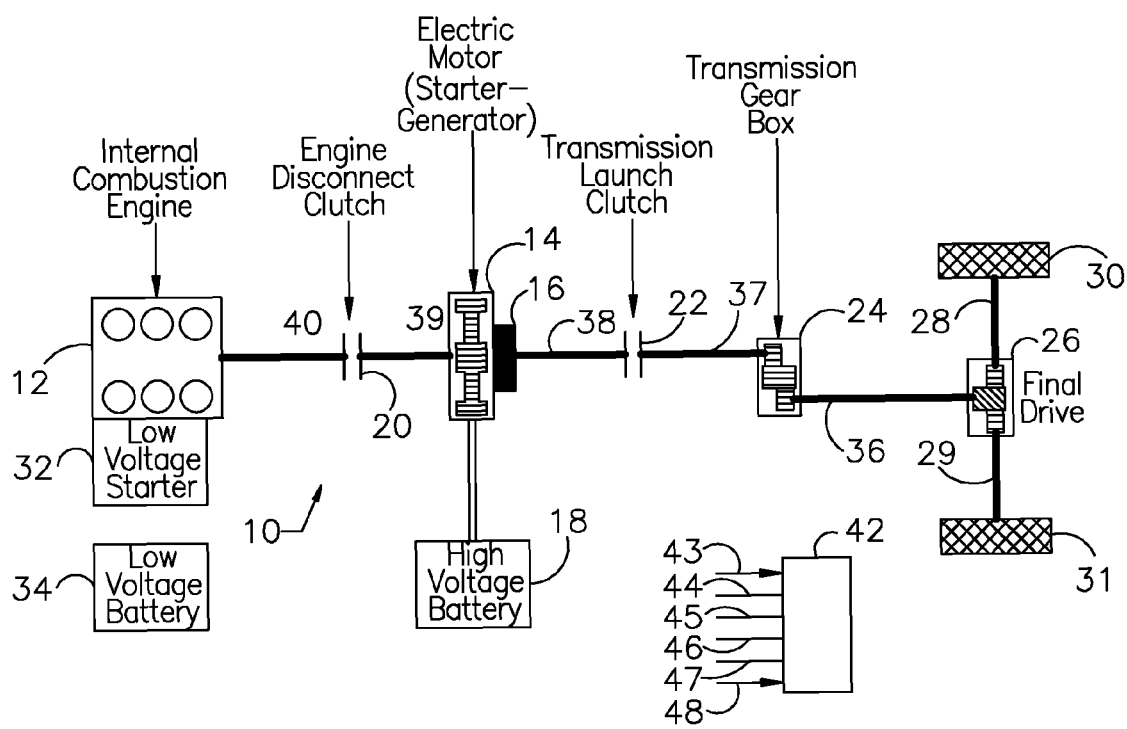
FIG. 1 is a schematic diagram of a powertrain for a hybrid electric vehicle (HEV) that includes a modular hybrid transmission (MHT)

The powertrain 10 of FIG. 1 includes an engine 12; an electric motor 14, such as a starter-generator; transmission oil pump; a high voltage battery 18; engine disconnect clutch 20; transmission launch clutch; transmission gear box 24; final drive 26; rear axle shafts 28, 29; rear wheels 30, 31; low voltage starter 32; a low voltage battery 34; a rear driveshaft 36 connecting the gearbox 24 and final drive 26; and drive shafts 37-40 interconnecting other components of the powertrain 10. The low voltage starter 32 overcomes the engine compression while the electric motor 14 is propelling the vehicle during an engine start. Thus, there is no torque dropout during vehicle acceleration.

The combination of engine disconnect clutch 20, electric motor 14, and transmission launch clutch 22 replaces the function of a torque converter in the powertrain 10. Because there is no torque converter in powertrain 10, any desired torque converter function must be accomplished by using these three components 14, 20, 22 with new or changed control algorithms.

Figure 2:
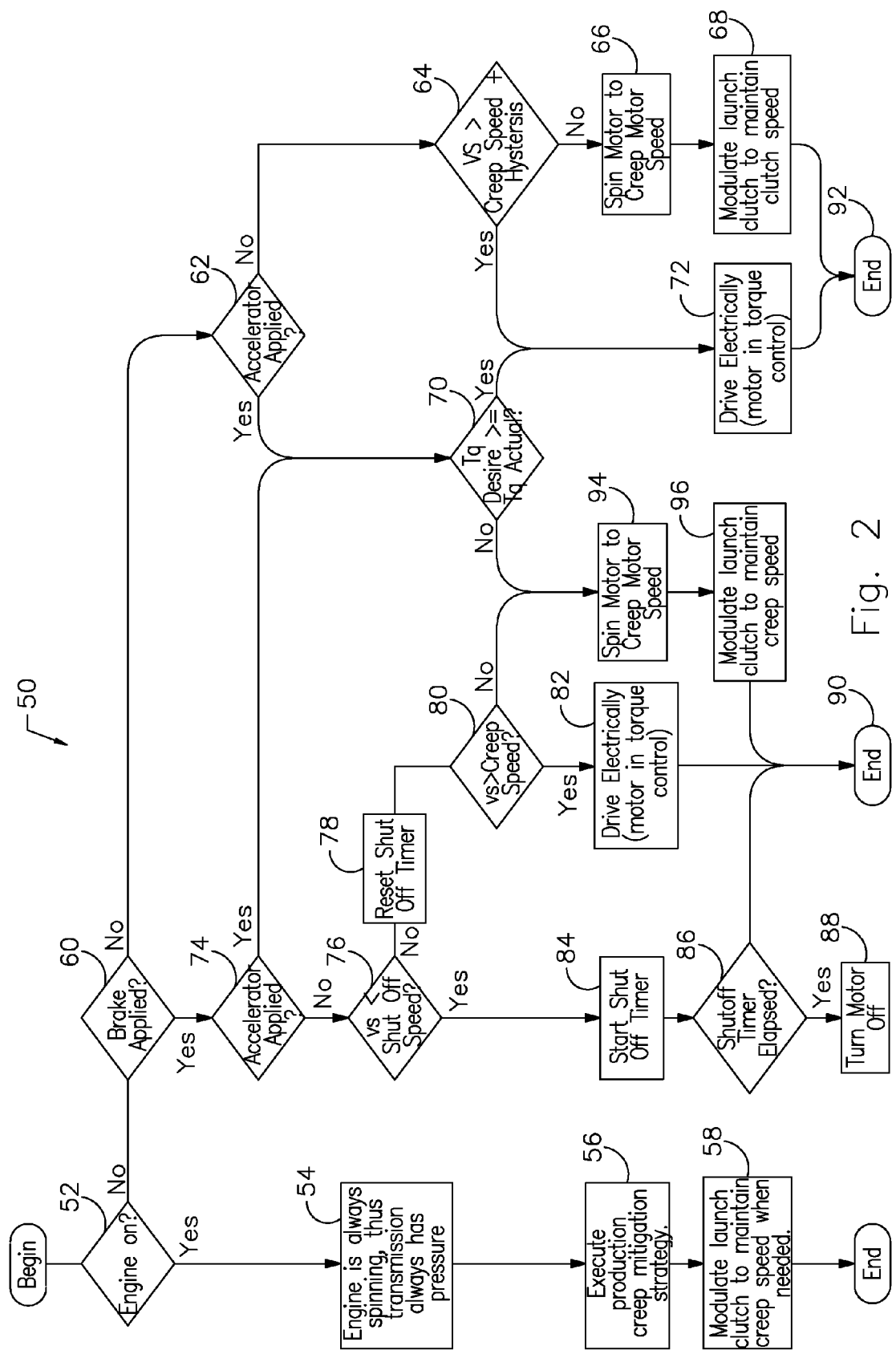
FIG. 2 is logic flow diagram of an algorithm for controlling vehicle creep.

The software algorithm 50 of FIG. 2 controls vehicle creep. The algorithm 50 is run continuously in a recurring software loop by a controller 42, which receives the following input signals: accelerator pedal position 43, brake pedal or wheel brake pressure 44, vehicle speed 45, speed 46 of motor 14, desired motor torque Tq Desired 47, and actual torque Tq Actual delivered by the motor 48.

At step 52 of algorithm 50 a test is performed to determine whether the engine 12 is on. If the result of test 52 is logically true, at step 54 the vehicle is creeping due to power produced by the engine 12 in response to a power or torque demand signal from controller 42. The crankshaft of engine 12 rotates at a minimum speed, and vehicle creep speed is maintained by controlling the torque transmitting capacity of clutches 20 and 22.

Figure 3:
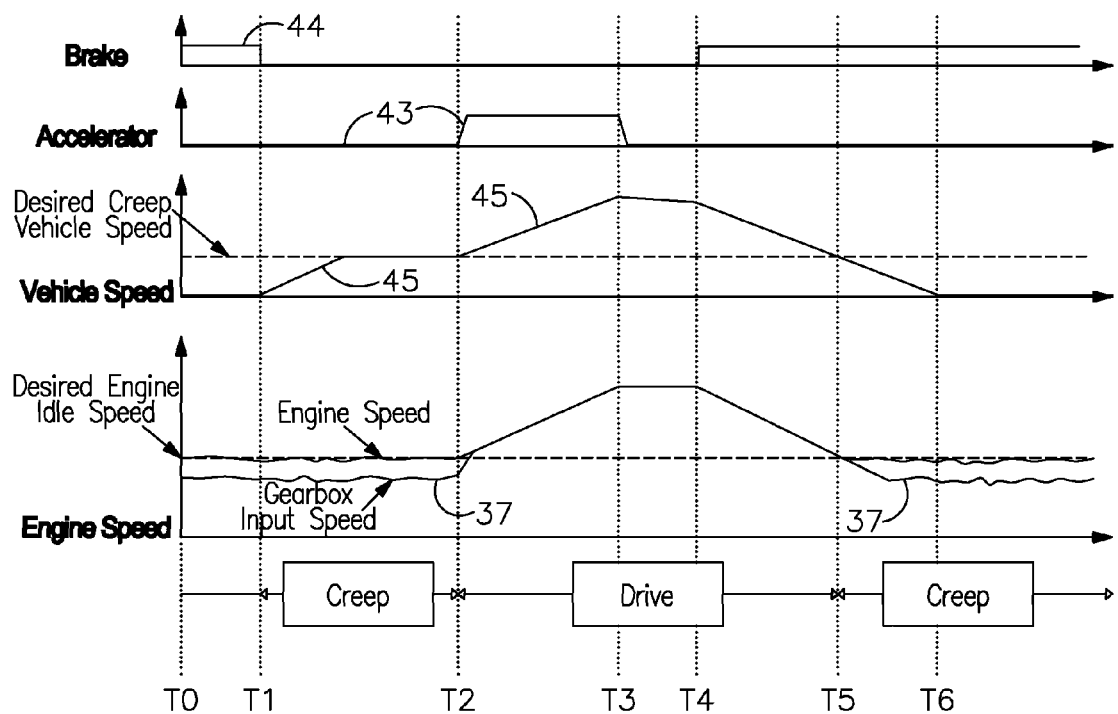
FIG. 3 shows the variation of powertrain parameters while the engine of FIG. 1 is producing vehicle creep.

Powertrain operation while producing vehicle creep with the engine on and under control of steps 54, 56, 58 is shown graphically in FIG. 3. From time T0 to T1, the drivers foot depresses brake 44 and the vehicle is at rest. The shaft of engine 12 rotates, and the launch clutch 22 is either open or slipping. At time T1, the driver releases the brake pedal 44. From time T1 to T2, the torque capacity of launch clutch 22 is controlled to accelerate the vehicle and keep the vehicle at the desired creep speed. At time T2, the driver depresses the accelerator pedal 43. From time T2 to T3, the vehicle accelerates 45. At Time T3, the driver releases the accelerator pedal 43, and the vehicle begins to coast. At time T4, the driver depresses the brake pedal 44, and vehicle speed 45 decelerates. At time T5, vehicle speed drops below the desired creep speed, and the launch clutch 22 must slip to prevent engine stalling. At time T6, the vehicle comes to rest, and the launch clutch 22 will slip or open.

If the result of test 52 is false indicating that the engine 12 is off, at step 60 a test is performed to determine whether the brake pedal 44 is depressed. If the result of test 60 is false indicating that pedal 44 is released, at step 62 a test is performed to determine whether accelerator pedal 43 is applied. The degree to which the accelerator pedal is depressed is used to determine the desired wheel torque, which is related to motor torque upon accounting for the current gear ratio of transmission 24 and the constant gear ratio of final drive 26. If the result of test 62 is false indicating that pedal 43 is released, at step 64 a test is performed to determine whether vehicle speed (VS) is greater than a reference vehicle speed, preferably comprising desired vehicle creep speed plus a predetermined incremental speed to account for hysteresis.

If the result of test 64 is false indicating that vehicle speed is low relative to the reference vehicle speed, at step 66 the speed of motor 14 is increased to a desired creep motor speed 14. At step 68 the torque capacity of transmission clutch 22 is controlled to maintain the desired vehicle creep speed.

Figure 4:
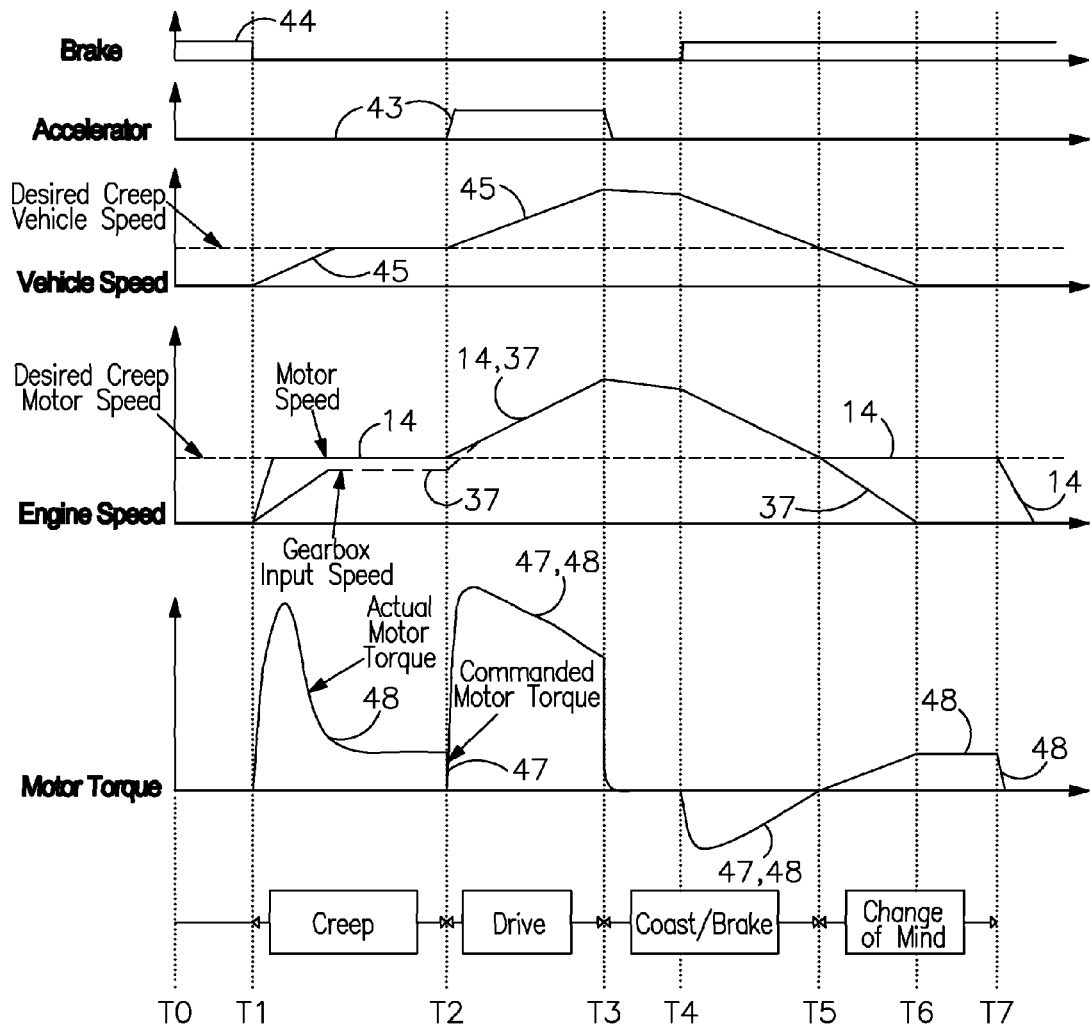
FIG. 4 shows the variation of powertrain parameters while a motor of FIG. 2 is producing vehicle creep.

Powertrain operation while producing vehicle creep with the engine off is shown graphically in FIG. 4. From time T0 to T1, the driver depresses brake pedal 44, and the vehicle is at rest. The electric motor 14 and transmission pump 16 are off. At time T1, the driver releases brake pedal 44. The motor 14 is in speed control, and the desired motor speed is higher than the desired speed of gearbox input 37 to allow some margin for slipping the launch clutch 22. From T1 to T2, the rotor of transmission pump 16 begins to rotate with motor 14, and transmission line pressure increases. The vehicle accelerates, and the torque capacity of launch clutch 22 is controlled to maintain vehicle creep speed constant. At time T2, the driver depresses the accelerator pedal 43. When the commanded motor torque 47 exceeds the actual motor torque 48, the motor 14 switches from speed control to torque control, and vehicle speed 45 increases. At time T3, the driver releases the accelerator pedal 43, and the vehicle coasts. At time T4, the driver depresses brake pedal 43, and vehicle speed 45 decreases. At time T5, launch clutch 22 begins slipping to allow the input shaft speed 37 to decrease below the motor speed 14. At time T6, the vehicle comes to rest. From T5 to T7, motor 14 rotates even though the vehicle speed continues to decrease, thereby keeping transmission pump 16 rotating and maintaining full line pressure.

If the driver were to release the brake pedal 44 in the region T5 to T7, the vehicle speed 14 would increase to the desired creep speed with no discernable disruption in operation. If the driver were to depress the accelerator pedal 43 in the region T5 to T7, the transmission 24 would be able to launch the vehicle because line pressure is being maintained. The time from T5 to T7 represents a "change of mind" region.

If the result of test 52 is false indicating that the engine 12 is off, the result of test 60 is false indicating that pedal 44 is released, and the result of test 62 is true indicating that accelerator pedal 43 is depressed, at step 70 a test is performed to determine whether desired motor torque 47 is equal to or greater than actual motor torque 48.

If the result of test 70 is true indicating that actual motor torque 46 is low relative to the desired motor torque 47, at step 72 motor 14 is used in torque control, such that actual motor torque 48 is increased and maintained substantially equal to the desired motor torque 47, as is shown graphically in FIG. 4 from time T2 to T3.

FIG. 2 shows the steps of algorithm 50 when the driver is not depressing either the brake pedal 44 or accelerator pedal 43, and vehicle speed 45 is above the desired vehicle creep speed. These conditions occur when the vehicle is decelerating after being driven, or when the vehicle speed increases over the vehicle creep speed while travelling downhill.

If the result of test 52 is false indicating that the engine 12 is off, the result of test 60 is false indicating that pedal 44 is released, the result of test 62 is false indicating that accelerator pedal 43 is not depressed, and the result of test 64 is true indicating that vehicle speed (VS) is high relative to a reference vehicle speed, at step 72 during vehicle deceleration motor 14 is used in torque control, such that regenerative braking occurs or simulated engine compression braking algorithms decelerate the vehicle using the motor 14. This is shown graphically in FIG. 4 from time T3 to T4.

FIG. 2 shows the steps of algorithm 50 when decelerating the vehicle while the brake 44 is depressed and the accelerator pedal 43 is not depressed. If the result of test 52 is false indicating that the engine 12 is off, the result of test 60 is true indicating that brake pedal 44 is depressed, the result of test 74 is false indicating that the accelerator pedal is not depressed, and the result of test 76 is false indicating that vehicle speed is greater than shut off speed, at step 78 a shut off timer is reset. If the result of test 80 is true indicating that vehicle speed is greater than desired vehicle creep speed, at step 82 the motor 14 is in torque control, where regenerative braking occurs or simulated engine compression braking algorithms decelerate the vehicle using the motor 14. This is shown graphically in FIG. 4 from time T4 to T5.

FIG. 2 shows the steps of algorithm 50 when brake pedal 44 is depressed and vehicle speed 45 decreases to a certain speed, preferably to zero vehicle speed. If the result of test 52 is false indicating that the engine 12 is off, the result of test 60 is true indicating that brake pedal 44 is depressed, the result of test 74 is false indicating that accelerator pedal 43 is released, and the result of test 76 is true indicating that vehicle speed is less than a shutoff speed, at step 84 a shutoff timer is started.

At step 86 a test is performed to determine whether the shutoff timer has expired. If the shutoff time expires during the "change of mind" interval from time T5 to T7 in FIG. 4, at step 88 motor 14 is turned off. If the timer has not expired, at step 90 execution of algorithm ends.

As shown graphically in FIG. 4, motor 14 is rotating at a desired speed near engine idle speed. If the driver takes no further action, the shutoff timer will expire and motor speed 14 decreases to zero speed to conserve energy. The time interval specified by the shutoff timer is the "change of mind" interval from time T5 to T7. During this period, motor 14 is still rotating, and the transmission pump 16 is maintaining full line pressure. If the driver releases the brake pedal 44, or steps into the accelerator pedal 43 during this period, the vehicle can proceed at creep speed with no interruption due to loss of transmission line pressure.

FIG. 2 shows the steps of algorithm 50 when the driver has one foot on the brake pedal and one foot on the accelerator pedal. If the result of test 52 is false indicating that the engine 12 is off, the result of test 60 is true indicating that brake pedal 44 is depressed, and the result of test 74 is true indicating that accelerator pedal 43 is also depressed, at step 70 a test is performed to determine whether desired motor torque 47 is equal to or greater than actual motor torque 48.

If the result of test 70 is true indicating that actual motor torque 46 is low relative to the desired motor torque 47, at step 72 motor 14 is used in torque control, such that actual motor torque 48 is increased and maintained substantially equal to the desired motor torque 48, and at step 92 execution of algorithm 50 ends.

If the result of test 70 is false indicating that actual motor torque 46 is high relative to the desired motor torque 47, at step 94 motor 14 is used to produce the desired vehicle creep speed. At step 96 the torque capacity of launch clutch 22 is controlled to maintain the desired vehicle creep speed, and at step 90 execution of algorithm 50 ends.

If the driver-demanded motor torque 47 is low, the motor 14 is put into speed control with the desired creep motor speed as a target. The launch clutch 22 is then modulated to maintain vehicle speed. When the driver demanded motor torque 47 exceeds the actual motor torque 48 necessary to maintain vehicle creep, the motor 14 is put into torque control in order to drive the vehicle. This will maintain the motor speed at the minimum speed required for pump 16 to maintain transmission line pressure. The transmission will maintain functionality similar to that of a conventional vehicle in which the driver is operating the brake and accelerator concurrently.

In accordance with the provisions of the patent statutes, the preferred embodiment has been described. However, it should be noted that the alternate embodiments can be practiced otherwise than as specifically illustrated and described.

The invention claimed is:

1. A method for controlling vehicle creep, comprising:
   (a) if desired creep speed exceeds vehicle speed while an accelerator pedal is released, controlling motor speed to produce the desired creep speed;
   (b) if desired motor torque exceeds actual motor torque, controlling motor torque to produce the desired motor torque;
   (c) if vehicle speed is decreasing and exceeds the desired speed while the accelerator pedal is released, controlling motor torque to decelerate the vehicle to desired creep speed.

2. The method of claim 1, wherein step (a) further comprises:
   transmitting motor torque through a clutch, a gearbox and a final drive to vehicle wheels; and
   controlling a torque capacity of the clutch such that the desired creep speed is produced.

3. The method of claim 1, wherein step (b) further comprises:
   using the degree to which an accelerator pedal is depressed to determine the desired motor torque;
   transmitting motor torque through a clutch, a gearbox and a final drive to vehicle wheels; and
   controlling a torque capacity of the clutch such that the desired motor torque is produced.

4. The method of claim 3, further comprising:
   transmitting torque produced by an engine to a hydraulic pump through a second clutch;
   transmitting engine torque through the clutch, a gearbox, and a final drive to vehicle wheels;
   controlling the clutch to produce the desired creep speed.

5. The method of claim 1, wherein step (c) further comprises using regenerative braking to decelerate the vehicle.

6. The method of claim 1, wherein step (c) further comprises using engine compression braking to decelerate the vehicle.

7. The method of claim 1, further comprising:
   if vehicle speed is decreasing and is less than a reference vehicle speed while the accelerator pedal is released and a brake pedal is depressed, operating the motor at idle speed;
   using the motor to drive a hydraulic pump connected to a transmission;
   using the motor to drive vehicle wheels;
   starting a timer; and
   shutting the motor off if the timer expires.

8. The method of claim 7, further comprising:
   if, before the timer expires, one of the brake pedal is released and the accelerator pedal is depressed, using an engine and the transmission to drive the vehicle wheels.

9. The method of claim 8, further comprising controlling a torque capacity of a clutch to launch the vehicle.

10. The method of claim 1, further comprising:
    if the accelerator pedal and a brake pedal are depressed and desired motor torque is less than actual motor torque, controlling motor speed and a torque capacity of a clutch to produce the desired vehicle speed.

11. The method of claim 1, further comprising:
    if the accelerator pedal and a brake pedal are depressed and desired motor torque exceeds motor torque required to produce the desired creep speed, controlling motor torque to produce the desired vehicle creep speed and to drive a hydraulic pump at a speed that produces a desired line pressure in a transmission connected to an outlet of the pump.

12. A method for controlling vehicle creep, comprising:
    (a) controlling motor speed to produce a desired creep speed, if desired creep speed exceeds vehicle speed;
    (b) controlling motor torque to produce the desired motor torque, if desired motor torque exceeds actual motor torque;
    (c) controlling motor torque to decelerate the vehicle to creep speed, if vehicle speed is decreasing and exceeds the desired speed.

13. The method of claim 12, wherein step (a) further comprises:
    transmitting motor torque through a clutch, a gearbox and a final drive to vehicle wheels; and
    controlling a torque capacity of the clutch such that the desired creep speed is produced.

14. The method of claim 13, further comprising:
    transmitting torque produced by an engine to a hydraulic pump through a second clutch;
    transmitting engine torque through the clutch, a gearbox, and a final drive to vehicle wheels;
    controlling the clutch to produce the desired creep speed.

15. The method of claim 12, wherein step (b) further comprises:
    using the degree to which an accelerator pedal is depressed to determine the desired motor torque;
    transmitting motor torque through a clutch, a gearbox and a final drive to vehicle wheels; and
    controlling a torque capacity of the clutch such that the desired motor torque is produced.

16. The method of claim 12, wherein step (c) further comprises using regenerative braking to decelerate the vehicle.

17. The method of claim 12, wherein step (c) further comprises using engine compression braking to decelerate the vehicle.

18. The method of claim 12, further comprising:
if vehicle speed is decreasing and is less than a reference vehicle speed while an accelerator pedal is released and a brake pedal is depressed, operating the motor at idle speed;
using the motor to drive a hydraulic pump connected to a transmission;
using the motor to drive vehicle wheels;
starting a timer; and
shutting the motor off if the timer expires.

19. The method of claim 18, further comprising:
if, before the timer expires, one of the brake pedal is released and the accelerator pedal is depressed, using an engine and the transmission to drive the vehicle wheels.

20. The method of claim 19, further comprising controlling a torque capacity of a clutch to launch the vehicle.

21. The method of claim 12, further comprising:
if an accelerator pedal and a brake pedal are depressed and desired motor torque is less than actual motor torque, controlling motor speed and a torque capacity of a clutch to produce the desired vehicle speed.

22. The method of claim 12, further comprising:
if an accelerator pedal and a brake pedal are depressed and desired motor torque exceeds motor torque required to produce the desired creep speed, controlling motor torque to produce the desired vehicle creep speed and to drive a hydraulic pump at a speed that produces a desired line pressure in a transmission connected to an outlet of the pump.

23. A method for controlling vehicle creep, comprising:
(a) producing signals representing desired creep speed, vehicle speed, a depressed and released state of an accelerator pedal, actual motor torque;
(b) if any of said signals indicates that desired creep speed exceeds vehicle speed while the accelerator pedal is released, controlling motor speed to produce the desired creep speed;
(c) if desired motor torque exceeds actual motor torque, controlling motor torque to produce the desired motor torque;
(d) if any of the signals indicates that vehicle speed is decreasing and exceeds the desired creep speed while the accelerator pedal is released, controlling motor torque to decelerate the vehicle to the desired creep speed.

24. A method for controlling vehicle creep, comprising:
(a) producing signals representing desired creep speed, vehicle speed, desired motor torque, and actual motor torque;
(b) if any of said signals indicates that desired creep speed exceeds vehicle speed, controlling motor speed to produce the desired creep speed;
(c) if any of said signals indicates that desired motor torque exceeds actual motor torque, controlling motor torque to produce the desired motor torque;
(d) if any of said signals indicates that vehicle speed is decreasing and exceeds the desired creep speed, controlling motor torque to decelerate the vehicle to the desired creep speed.

* * * * *